3,108,139
METHOD FOR PREPARING TETRAALKYL QUATERNARY AMMONIUM BOROHYDRIDES
Trescott B. Larchar, Sr., Hamden, Conn., assignor to Olin Mathieson Chemical Corporation, a corporation of Virginia
No Drawing. Filed June 29, 1961, Ser. No. 120,538
7 Claims. (Cl. 260—567.6)

This invention relates to a method for the preparation of tetraalkyl ammonium borohydrides. In particular, this invention relates to a method for the preparation of tetraalkyl ammonium borohydrides in which an alkali metal borohydride is reacted with a tetraalkyl ammonium salt of an inorganic acid.

It has previously been reported that quaternary ammonium borohydrides, such as tetramethyl ammonium borohydride, can be prepared by the metathetical reaction of an alkali metal borohydride with a tetraalkyl ammonium salt of an organic or inorganic acid in certain polar solvents. It has been found, however, that when the preparation of such tetraalkyl ammonium borohydrides is attempted utilizing the polar solvents known to the art that, in general, impure products in low yield are obtained which are extremely difficult to recover from the reaction mixtures.

The borohydrides produced according to this invention are useful as sources of hydrogen. For example, upon acidification they readily liberate hydrogen. Tetraalkyl ammonium borohydrides are also powerful reducing agents in that they can be used in a wide variety of chemical solvents for rapidly reducing a great number of chemical compounds at low and moderate temperatures, especially as required in the manufacture of certain pharmaceuticals.

It has been found that tetraalkyl ammonium chlorides react metathetically with alkali metal borohydrides in the presence of a N,N'-dialkylformamide to give high yields of the corresponding tetraalkyl ammonium borohydrides. The reaction may be illustrated by the following equation:

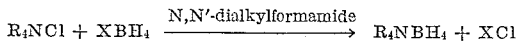
$$R_4NCl + XBH_4 \xrightarrow{N,N'\text{-dialkylformamide}} R_4NBH_4 + XCl$$

wherein R is an alkyl group containing 1 to 5 carbon atoms and X is an alkali metal. The N,N'-dialkylformamides are excellent solvents for both of the reactants. The alkali metal chloride, being insoluble in the N,N'-dialkylformamide, precipitates from the reaction mixture as soon as it is formed thus it can be conveniently removed by filtration. After removal of the alkali metal chloride, it has been found, surprisingly, that the addition of a lower dialkyl ether to the reaction mixture containing the tetraalkyl ammonium borohydride dissolved in the N,N'-dialkylformamide results in complete separation of the product. Recovery of the tetraalkyl ammonium borohydride by filtration or any other suitable method followed by drying of the ether-wet product results in the recovery of the desired tetraalkyl ammonium borohydride of exceptionally high purity and in good yield.

Although the reaction can be conveniently carried out at room temperature, if desired, temperatures as low as about −20° C. up to about +70° C. can be employed. The reaction time can be varied widely from about 10 minutes to about 5 hours or more depending on the reaction temperature and other reaction conditions utilized. In general, from about 0.5 to about 10 liters of lower dialkyl ether per liter of N,N'-dialkylformamide in the reaction mixture will be employed to precipitate the product.

Tetraalkyl ammonium chlorides suitable as starting materials for the process of this invention include, for example, tetramethyl ammonium chloride, tetraethyl ammonium chloride, tetraisopropyl ammonium chloride, tetrabutyl ammonium chloride, tetraamyl ammonium chloride, and the mixed tetraalkyl ammonium chlorides such as methyl-triethyl ammonium chloride, diethyl-diisopropyl ammonium chloride, etc. Lower dialkyl ethers having from 2 to 6 carbon atoms in each alkyl group such as diethyl ether, di-n-propyl ether, diisopropyl ether, ethyl-n-propyl ether, di-isobutyl ether, di-n-amyl ether, etc. are suitable for use in the process of this invention.

N,N'-dialkylformamides containing from 1 to 6 carbon atoms in each alkyl group are suitable solvents for the reactants utilized in this novel process. Useful N,N'-dialkylformamides include N,N'-dimethylformamide, N,N'-diethylformamide, N,N'-diisopropylformamide, N,N'-diamylformamide, etc. Although it has been previously suggested in the prior art that amides, such as formamide, are suitable solvents for the alkali metal borohydrides in the reaction with a tetraalkyl ammonium chloride, materials such as formamide are totally unsuited for the process of this invention. Despite the fact that the alkali metal borohydrides and the tetraalkyl ammonium borohydrides are soluble in formamide both the alkali metal borohydrides and the tetraalkyl ammonium borohydrides decompose steadily in formamide at room temperature thus prohibiting the use of such solvents. Both the alkali metal borohydrides and the tetraalkyl ammonium borohydrides dissolve readily in the N,N'-dialkylformamide at room temperature without any evidence of decomposition. Secondly, the reaction product which is the tetraalkyl ammonium borohydride can not be precipitated from formamide by the addition of a lower dialkyl ether since the lower dialkyl ethers are only very slightly soluble in formamide. In contrast, the lower dialkyl ethers are extremely soluble in the N,N'-dialkylformamides. An important advantage of the novel process of this invention is the high degree of completion of the reaction experienced when a N,N'-dialkylformamide is utilized as a solvent for the reactants. Although a wide variety of materials such as alcohols, amines, nitriles, water, etc. have been suggested by others as being suitable solvents in which to carry out the reaction of the tetraalkyl ammonium chlorides with alkali metal borohydrides, it has been found that incomplete reactions result in which low yields of impure products are obtained even with prolonged reaction time.

This invention will be further illustrated by the following examples which are to be considered not limitative.

EXAMPLE I

To a solution of 58.1 grams of tetraethyl ammonium chloride dissolved in 850 milliliters of N,N'-dimethylformamide there was added at ambient temperature with agitation a solution of 13.2 grams of sodium borohydride in 50 milliliters of N,N'-dimethylformamide. Agitation was continued for a period of about 15 minutes and at the end of that time the precipitated sodium chloride was removed by filtration. Next, 1,590 milliliters of diethyl ether was added to the reaction mixture. The white precipitate which resulted was removed from the reaction mixture by filtration and the precipitate so obtained was washed with 100 milliliters of ether. To the reaction mixture there was then added an additional quantity of diethyl ether in the amount of 640 milliliters in order to precipitate the final trace of the tetraalkyl ammonium borohydride product which was then removed from the reaction mixture by filtration and washed with about 100 milliliters of diethyl ether. The ether-wet products obtained from both precipitation operations were then combined and dried in a vacuum oven at 80° C. for 1.5 hours. A total of 33.3 grams (65.4 percent of the theoretical quantity) of the desired tetraethyl ammonium borohydride, a white material was obtained.

The product was analyzed and found to contain 7.48, 7.27 percent boron which corresponds closely to the calculated value of 7.46 percent thus indicating that the product had a purity of about 99 percent.

EXAMPLE II

In this example, six additional batches of tetraethyl ammonium borohydride were prepared using the same apparatus and procedure described in Example I. Experimental data relating to the preparation of these six batches is shown in Table I which follows:

*Table I*

|  | A | B | C | D | E | F |
|---|---|---|---|---|---|---|
| Tetraethyl Ammonium Chloride, g | 100 | 100 | 100 | 100 | 136.8 | 135.0 |
| Sodium Borohydride, g | 25 | 25 | 25 | 25 | 35 | 35 |
| N,N'-Dimethylformamide, ml | 900 | 900 | 900 | 725 | 950 | 900 |
| Reaction Time, min | 15 | 15 | 30 | 30 | 60 | 60 |
| Reaction Temperature, °C | 20 | 20 | 20 | 20 | 20 | 20 |
| Ether, ml | 1,270 | 1,270 | 1,270 | 1,270 | 1,910 | 1,910 |
| Product, g | 74.0 | 72.5 | 70.8 | 71.2 | 88.0 | 92.0 |

From the six batches (A, B, C, D, E and F) there was obtained a total of 468.5 grams of tetraethyl ammonium borohydride which corresponds to a yield of 86.5 percent based on the theoretical quantity.

The combined product was analyzed and found to contain 7.47, 7.32 percent boron which corresponds closely to the calculated value of 7.46 thus indicating that the product had a purity of about 99 percent.

What is claimed is:

1. A method for the preparation of a tetraalkyl ammonium borohydride which comprises (A) reacting a material of the formula:

$$R_4NCl$$

wherein R is an alkyl group having from 1 to 5 carbon atoms with an alkali metal borohydride selected from the group consisting of sodium borohydride and potassium borohydride in the presence of a compound of the formula:

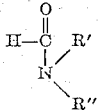

wherein R' and R" are alkyl radicals having from 1 to 6 carbon atoms at a temperature of from about −20° C. to about +70° C. thereby forming a reaction mixture comprising said compound, the corresponding tetraalkyl ammonium borohydride and an alkali metal chloride, (B) removing from the reaction mixture the alkali metal chloride, (C) adding to that portion of the reaction mixture remaining after removal of the alkali metal chloride an amount of a dialkyl ether having from 2 to 6 carbon atoms in each alkyl group sufficient to precipitate the tetraalkyl ammonium borohydride therefrom, and (D) recovering the said tetraalkyl ammonium borohydride.

2. The method for the preparation of tetraethyl ammonium borohydride which comprises (A) reacting tetraethyl ammonium chloride with sodium borohydride in the presence of N,N'-dimethylformamide at a temperature of from about −20° C. to about +70° C. thereby forming a reaction mixture comprising the said N,N'-dimethylformamide, tetraethyl ammonium borohydride, and sodium chloride, (B) removing sodium chloride from the reaction mixture, (C) adding to that portion of the reaction mixture remaining after removal of the sodium chloride sufficient diethyl ether to precipitate the tetraethyl ammonium borohydride therefrom, and (D) recovering the tetraethyl ammonium borohydride.

3. The method of claim 1 wherein the alkali metal borohydride is sodium borohydride.

4. The method of claim 1 wherein the alkali metal borohydride is potassium borohydride.

5. The method of claim 1 wherein said material is tetraethyl ammonium chloride.

6. The method of claim 1 wherein the said compound is N,N'-dimethylformamide.

7. The method of claim 1 wherein the dialkyl ether is diethyl ether.

References Cited in the file of this patent

UNITED STATES PATENTS 2,738,369     Banus et al.     Mar. 13, 1956